US012088988B2

(12) United States Patent
Chen et al.

(10) Patent No.: US 12,088,988 B2
(45) Date of Patent: Sep. 10, 2024

(54) VENTING DEVICE AND VENTING METHOD THEREOF

(71) Applicant: xMEMS Labs, Inc., Santa Clara, CA (US)

(72) Inventors: Wen-Chien Chen, New Taipei (TW); Kai-Chieh Chang, Hsinchu (TW); Chiung C. Lo, San Jose, CA (US); Yuan-Shuang Liu, Hsinchu County (TW)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/530,235

(22) Filed: Dec. 6, 2023

(65) Prior Publication Data

US 2024/0121547 A1 Apr. 11, 2024

Related U.S. Application Data

(63) Continuation-in-part of application No. 17/842,810, filed on Jun. 17, 2022, now Pat. No. 11,884,535, (Continued)

(51) Int. Cl.
*H04R 1/10* (2006.01)

(52) U.S. Cl.
CPC ......... *H04R 1/1041* (2013.01); *H04R 1/1016* (2013.01); *H04R 2460/11* (2013.01)

(58) Field of Classification Search
CPC ............... F16K 31/006; F16K 37/0041; F16K 99/0048; F16K 99/0015; H10N 30/87; (Continued)

(56) References Cited

U.S. PATENT DOCUMENTS 5,970,998 A 10/1999 Talbot
8,532,320 B2 9/2013 Nordahn
(Continued)

FOREIGN PATENT DOCUMENTS

CN 101785327 A 7/2010
CN 104540776 A 4/2015
(Continued)

OTHER PUBLICATIONS

Liang, the specification, including the claims, and drawings in the U.S. Appl. No. 17/344,983, filed Jun. 11, 2021.
(Continued)

*Primary Examiner* — Carolyn R Edwards
*Assistant Examiner* — Julie X Dang
(74) *Attorney, Agent, or Firm* — Winston Hsu

(57) ABSTRACT

A venting device includes a first flap, which is configured to be actuated to swing upward during a rising time, and a second flap, which is disposed opposite to the first flap and configured to be actuated to swing downward during a falling time, a first actuating portion disposed on the first flap, and a second actuating portion disposed on the second flap. The venting device configured to form a vent is disposed within a wearable sound device or to be disposed within the wearable sound device. The vent is formed via applying a first voltage to the first actuating portion and applying a second voltage on the second actuating portion, such that the venting device gradually forms the vent.

21 Claims, 10 Drawing Sheets

Related U.S. Application Data which is a continuation-in-part of application No. 17/344,980, filed on Jun. 11, 2021, now Pat. No. 11,399,228.

(60) Provisional application No. 63/050,763, filed on Jul. 11, 2020, provisional application No. 63/051,885, filed on Jul. 14, 2020, provisional application No. 63/171,919, filed on Apr. 7, 2021, provisional application No. 63/320,703, filed on Mar. 17, 2022, provisional application No. 63/447,048, filed on Feb. 21, 2023.

(58) Field of Classification Search
CPC ......... H10N 30/2042; H10N 30/10513; H10N 30/2047; H04R 1/1041; H04R 1/1016; H04R 2460/11; H04R 1/2823; H04R 1/2826; H04R 1/1091; H04R 1/1008; H04R 1/10; H04R 2201/003; H04R 2460/01; H04R 1/1083; H04R 31/003; H04R 2231/003; H04R 7/06; H04R 17/00; H04R 19/005; H02N 1/006; G10K 15/04
See application file for complete search history.

(56) References Cited

U.S. PATENT DOCUMENTS

| | | | | |
|---|---|---|---|---|
| 8,724,200 | B1 | 5/2014 | Wu | |
| 10,067,734 | B2 | 9/2018 | Watson | |
| 10,367,540 | B1 | 7/2019 | Medapalli | |
| 11,323,797 | B2 | 5/2022 | Liang | |
| 11,399,228 | B2 | 7/2022 | Liang | |
| 2003/0029705 | A1 | 2/2003 | Qiu | |
| 2006/0131163 | A1 | 6/2006 | Mei | |
| 2007/0007858 | A1 | 1/2007 | Sorensen | |
| 2008/0267416 | A1* | 10/2008 | Goldstein | H04R 3/00 381/56 |
| 2010/0020991 | A1 | 1/2010 | Chen | |
| 2011/0013300 | A1 | 1/2011 | Wu | |
| 2011/0051985 | A1 | 3/2011 | Hwang | |
| 2011/0103616 | A1 | 5/2011 | Kwon | |
| 2011/0181150 | A1* | 7/2011 | Mahameed | H01H 57/00 29/25.35 |
| 2012/0053393 | A1* | 3/2012 | Kaltenbacher | H04R 25/606 29/25.35 |
| 2012/0082335 | A1 | 4/2012 | Duisters | |
| 2013/0121509 | A1 | 5/2013 | Hsu | |
| 2013/0223023 | A1 | 8/2013 | Dehe | |
| 2014/0140558 | A1 | 5/2014 | Kwong | |
| 2015/0163599 | A1 | 6/2015 | Shim | |
| 2015/0204940 | A1 | 7/2015 | Teeter | |
| 2015/0237438 | A1 | 8/2015 | Lee | |
| 2016/0176704 | A1* | 6/2016 | Cargill | H04R 19/005 257/419 |
| 2016/0381464 | A1* | 12/2016 | Elyada | G10K 15/04 381/97 |
| 2017/0011600 | A1 | 1/2017 | Joung | |
| 2017/0021391 | A1 | 1/2017 | Guedes | |
| 2017/0040012 | A1 | 2/2017 | Goldstein | |
| 2017/0041708 | A1* | 2/2017 | Barzen | G10K 15/04 |
| 2017/0164115 | A1 | 6/2017 | van Halteren | |
| 2017/0201192 | A1* | 7/2017 | Tumpold | H04R 7/06 |
| 2017/0217761 | A1* | 8/2017 | Chung | H04R 19/005 |
| 2017/0260044 | A1 | 9/2017 | Cargill | |
| 2017/0325030 | A1 | 11/2017 | Stoppel | |
| 2018/0002168 | A1 | 1/2018 | Cargill | |
| 2018/0020194 | A1 | 1/2018 | Kim | |
| 2018/0120938 | A1 | 5/2018 | Frescas | |
| 2019/0039880 | A1* | 2/2019 | Paci | B81B 3/0021 |
| 2019/0098390 | A1 | 3/2019 | Carino | |
| 2019/0181776 | A1* | 6/2019 | Tumpold | H04R 7/06 |
| 2019/0208343 | A1 | 7/2019 | Monti | |
| 2019/0215620 | A1 | 7/2019 | Albahri | |
| 2019/0349665 | A1 | 11/2019 | Grinker | |
| 2020/0100033 | A1* | 3/2020 | Stoppel | H04R 31/003 |
| 2020/0178000 | A1 | 6/2020 | Niekiel | |
| 2020/0178003 | A1 | 6/2020 | Zurbruegg | |
| 2020/0193973 | A1 | 6/2020 | Tolomei | |
| 2020/0196067 | A1 | 6/2020 | Rusconi Clerici Beltrami | |
| 2020/0211521 | A1* | 7/2020 | Voss | H04R 7/04 |
| 2020/0213770 | A1* | 7/2020 | Duan | H04R 17/02 |
| 2020/0244275 | A1 | 7/2020 | Marzin | |
| 2020/0352788 | A1* | 11/2020 | Van 'T Hof | H04R 1/1016 |
| 2021/0281940 | A1* | 9/2021 | Zhao | H04R 17/00 |
| 2022/0014836 | A1 | 1/2022 | Liang | |

FOREIGN PATENT DOCUMENTS

| | | | |
|---|---|---|---|
| CN | 105009604 | A | 10/2015 |
| CN | 106937193 | A | 7/2017 |
| CN | 107223346 | A | 9/2017 |
| CN | 108702575 | A | 10/2018 |
| CN | 110022506 | A | 7/2019 |
| CN | 209402687 | U | 9/2019 |
| CN | 111063790 | A | 4/2020 |
| EP | 3 896 990 | A1 | 10/2021 |
| JP | 11-307441 | A | 11/1999 |
| JP | 2009-512375 | A | 3/2009 |
| JP | 2012-249184 | A | 12/2012 |
| JP | 2016-51915 | A | 4/2016 |
| JP | 2017-112531 | A | 6/2017 |
| JP | 2020-31444 | A | 2/2020 |
| JP | 2022-16392 | A | 1/2022 |
| KR | 10-2010-0002351 | A | 1/2010 |
| KR | 10-2012-0034085 | A | 4/2012 |
| KR | 10-2015-0030691 | A | 3/2015 |
| KR | 10-2015-0097292 | A | 8/2015 |
| KR | 10-2017-0139320 | A | 12/2017 |
| KR | 10-2022-0007717 | A | 1/2022 |
| TW | I650025 | B | 2/2019 |
| TW | 202203662 | A | 1/2022 |
| WO | 2019/177324 | A1 | 9/2019 |
| WO | 2021/202023 | A1 | 10/2021 |

OTHER PUBLICATIONS

Hyonse Kim et al, A slim type microvalve driven by PZT films, Sensors and Actuators A: Physical, Jan. 18, 2005, pp. 162-171, vol. 121, Elsevier B. V., XP027806904.

Wang Zhicheng, Stylish structure and innovative features of new generation speakers, Household Electric Appliances, Issue 12, 2003, p. 38-40, China Academic Journal Electronic Publishing House ,2003.

Zhou Xiao-wei et al., Preliminary evaluation of predicative performance of BAHA softband in the conductive or mixed hearing loss patients, Journal of Otolaryngology and Ophthalmology of Shandong University, vol. 29, Issue No. 2, 2015, p. 28-30, China Academic Journal Electronic Publishing House. ,Apr. 16, 2015.

Stefan Liebich et al., active occlusion cancellation with hear-through equalization for headphones, Institute of Communication Systems, 2018 IEEE international conference on acoustics, speech and signal processing. Canada ,Apr. 2018.

Shen Guohao et al., Structure optimization design for capacitive silicon-based MEMS microphone, Semiconductor Devices, vol. 43, No. 12, p. 912-917, China Academic Journal Electronic Publishing House. ,Dec. 3, 2018.

Hua Qing et al., Acoustoeletric model of piezoelectric microphone with package structure, Transducer and Microsystem Technologies, 2018 vol. 37, No. 11, p. 42-44, China Academic Journal Electronic Publishing House. ,Nov. 30, 2018.

Chen Guidong et al., Highly sensitive MEMS humidity sensor based on candle-soot nanoparticle layer , Micronanoelectronic Technology, vol. 57, No. 1, p. 36-40, p. 48, China Academic Journal Electronic Publishing House ,Jan. 2020.

* cited by examiner

VENTING DEVICE AND VENTING METHOD THEREOF

CROSS REFERENCE TO RELATED APPLICATIONS

This application is a continuation-in-part of U.S. application Ser. No. 17/842,810, filed on Jun. 17, 2022, which is a continuation-in-part of U.S. application Ser. No. 17/344,980, filed on Jun. 11, 2021, which claims the benefit of U.S. Provisional Application No. 63/050,763, filed on Jul. 11, 2020, and claims the benefit of U.S. Provisional Application No. 63/051,885, filed on Jul. 14, 2020, and claims the benefit of U.S. Provisional Application No. 63/171,919, filed on Apr. 7, 2021. Besides, U.S. application Ser. No. 17/842,810 claims the benefit of U.S. Provisional Application No. 63/320,703, filed on Mar. 17, 2022. Further, this application claims the benefit of U.S. Provisional Application No. 63/447,048, filed on Feb. 21, 2023. The contents of these applications are incorporated herein by reference.

BACKGROUND OF THE INVENTION

1. Field of the Invention

The present invention relates to a venting device and a venting method thereof, and more particularly, a venting device and a venting method thereof, which reduce occlusion effect and improve user experience.

2. Description of the Prior Art

Occlusion effect arises from the sealed volume of an ear canal, which causes perceived pressure by the listener. For example, occlusion effect occurs when the listener wearing a wearable sound device in his/her ear canal engages in specific movement(s) that generates bone-conducted sound (e.g., jogging). However, releasing the pressure inside a closed field chamber may result in click noise. To enhance listening experience, there is room for further improvement when it comes to occlusion effect.

SUMMARY OF THE INVENTION

It is therefore a primary objective of the present application to provide a venting device and a venting method thereof, to improve over disadvantages of the prior art.

An embodiment of the present application discloses a venting device comprising a first flap, configured to be actuated to swing upward during a rising time; a second flap, disposed opposite to the first flap and configured to be actuated to swing downward during a falling time; a first actuating portion, disposed on the first flap; and a second actuating portion, disposed on the second flap; wherein the venting device, configured to form a vent, is disposed within a wearable sound device or to be disposed within the wearable sound device; wherein the vent is formed via applying a first voltage to the first actuating portion and applying a second voltage on the second actuating portion, such that the venting device gradually forms the vent.

An embodiment of the present application discloses a venting method, comprising actuating a first flap to gradually swing upward during a rising time; and actuating a second flap to gradually swing downward during a falling time; wherein the venting method is applied for a venting device; wherein the venting device is disposed within a wearable sound device or to be disposed within the wearable sound device; wherein the venting device is configured to form a vent; wherein the venting device comprises the first flap and the second flap.

An embodiment of the present application discloses a venting device, comprising a first flap, configured to be actuated to gradually swing upward during a rising time or gradually swing downward during a falling time; and a second flap, disposed adjacent to the first flap; wherein the venting device, configured to form a vent, is disposed within a wearable sound device or to be disposed within the wearable sound device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
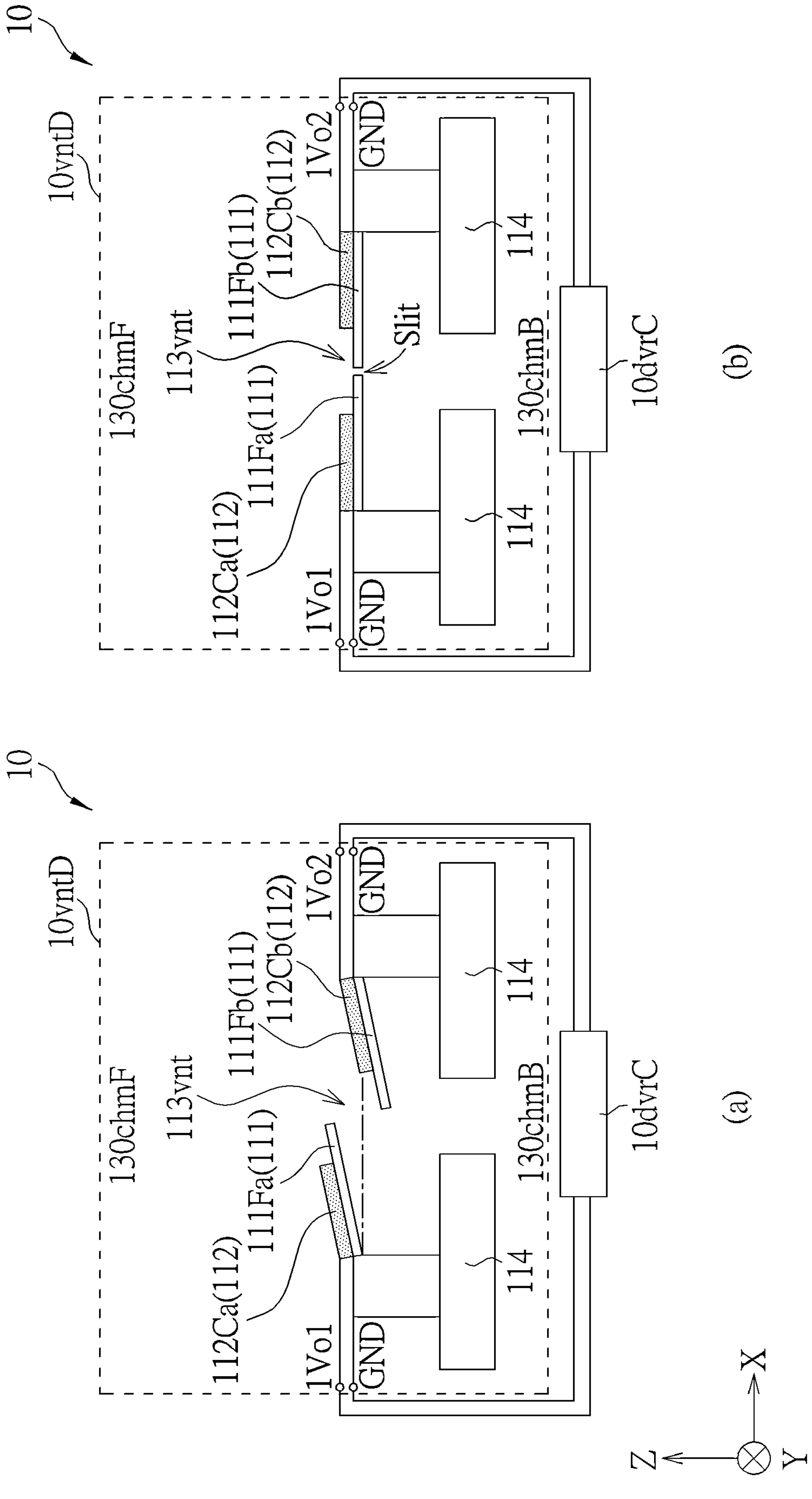
FIG. 1 is a schematic diagram of a wearable sound device according to embodiments of the present application.

FIG. 1 is a schematic diagram of a wearable sound device 10 according to embodiments of the present application. The wearable sound device 10 (e.g., an in-ear device) may include a venting device 10*vnt*D and a driving circuit 10*dvr*C.

The venting device 10*vnt*D may include a film structure 111 and an actuator 112, which may be manufactured according to U.S. application Ser. No. 17/344,980. A slit may divide the film structure 111 into two flaps 111Fa and 111Fb opposite to each other. The flap 111Fa/111Fb may include a free end and an anchored end fixed to a substrate 114. The actuator 112 may include actuating portions 112Ca and 112Cb, which are disposed on the flaps 111Fa and 111Fb, respectively.

The driving circuit 10*dvr*C, which is configured to drive the venting device 10*vnt*D, may output a voltage 1Vo1 to the actuating portion 112Ca and output a voltage 1Vo2 to the actuating portion 112Cb, such that the flap 111Fa/111Fb may be actuated by the actuating portion 112Ca/112Cb to swing/tilt upward or downward to facilitate a dynamic vent.

In other words, the wearable sound device 10 may be switched between a first/open mode shown in FIG. 1 (*a*) to open a vent 113*vnt* and a second/close mode shown in FIG. 1 (*b*) to close the vent 113*vnt*. To operate the wearable sound device 10 in the first/open mode, the flap 111Fa may incline upward and the flap 111Fb may incline downward. When the difference between the free ends of the flaps 111Fa and 111Fb is greater than the thickness of the film structure 111 as shown in FIG. 1 (*a*), the vent 113*vnt* is said to be opened or formed. An airflow channel is thus created between a volume 130*chm*F (connected to or to be connected to an ear canal) and a volume 130*chm*B (connected to or to be connected to the external ambient environment) to release/reduce pressure caused by occlusion effect.

It can be regarded that, the slit is formed between the flap 111Fa and the flap 111Fb, and the vent (e.g., 113*vnt*) is formed/opened because of the slit.

To operate the wearable sound device 10 in the second/close mode, the flaps 111Fa and 111Fb move in the opposite way: For example, the flap 111Fa may swing downward and the flap 111Fb may swing upward. After the flaps 111Fa and 111Fb align themselves substantially parallel to each other as shown in FIG. 1 (*b*), the vent 113*vnt* is said to be closed or sealed, and the volumes 130*chm*F and 130*chm*B are barely connected, which can avoid significant drops in sound pressure level (SPL) at lower frequencies.

Figure 2:
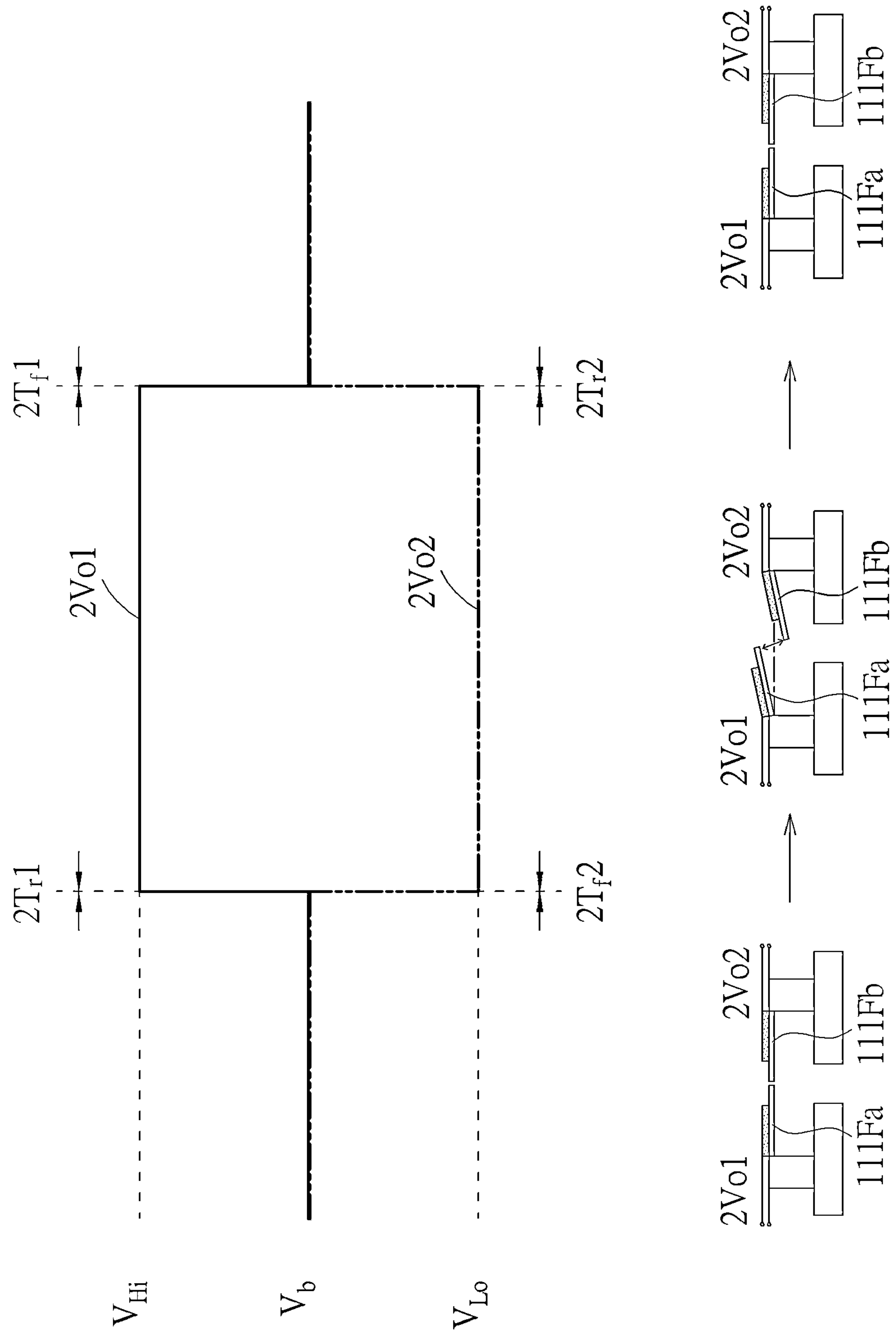
FIG. 2 and FIG. 3 are timing diagrams of voltages according to embodiments of the present application.

However, click noise may occur during the switching. For example, FIG. 2 is a timing diagram of voltages 2Vo1, 2Vo2 according to an embodiment of the present application. The voltages 1Vo1, 1Vo2 may be implemented using the voltages 2Vo1, 2Vo2.

To open the vent 113*vnt*, as shown in FIG. 2, the voltage 2Vo1 applied to the actuating portion 112Ca instantly increases from a common voltage $V_b$ to a high level voltage VIE during a rising time 2$T_r$1 for the flap 111Fa to swing upward, and the voltage 2Vo2 applied to the actuating portion 112Cb rapidly decreases from the common voltage $V_b$ to a low level voltage $V_{Lo}$ during a falling time 2$T_f$2 for the flap 111Fb to swing downward. To close the vent 113*vnt*, the voltage 2Vo1 suddenly decreases from the high level voltage VIE to the common voltage $V_b$ during a falling time 2$T_f$1 for the flap 111Fa to swing downward, and the voltage 2Vo2 instantaneously increases from the low level voltage $V_{Lo}$ to the common voltage $V_b$ during a rising time 2$T_r$2 for the flap 111Fb to swing upward. In an embodiment, the high level voltage VIE, the common voltage $V_b$, and the low level voltage $V_{Lo}$ may be 30, 15, 0 volts (V), respectively.

Since the rising time 2$T_r$1, 2$T_r$2, and the falling time 2$T_f$1, 2$T_f$2 are short (e.g., nearly 0 seconds), the vent 113*vnt* is opened/slammed quickly. The flaps 111Fa and 111Fb moving fast within very short time can result in the production of click noise due to high acoustic nonlinearity.

Figure 3:
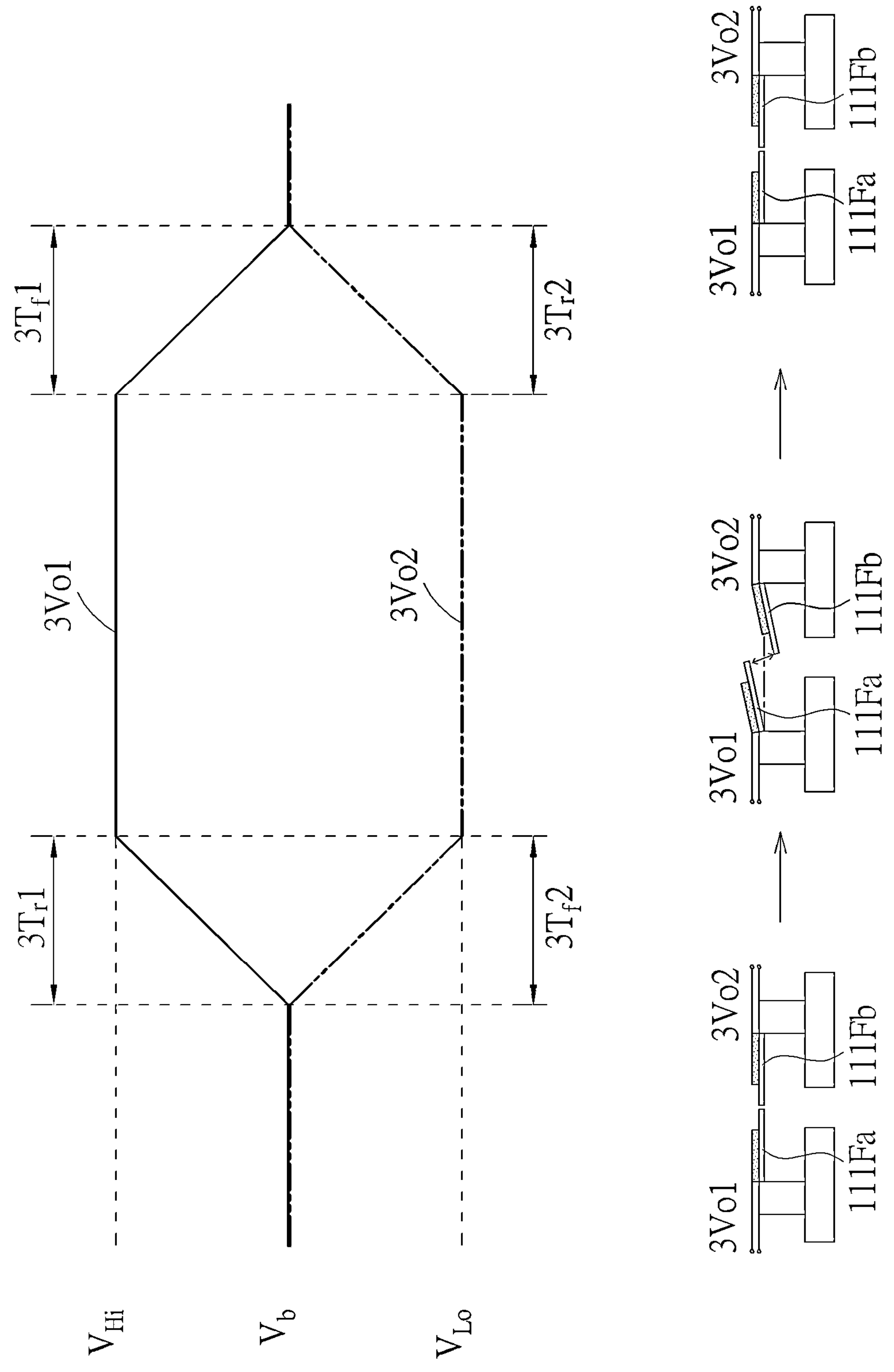

Click noise may be reduced by slowing down the movement of the flaps 111Fa and 111Fb. For example, FIG. 3 is a timing diagram of voltages 3Vo1, 3Vo2 according to an embodiment of the present application. The voltages 1Vo1, 1Vo2 may be implemented using the voltages 3Vo1, 3Vo2.

Different from FIG. 2, a rising time 3$T_r$1 (during which the voltage 3Vo1 gradually ramps up), a falling time 3$T_f$1 (during which the voltage 3Vo1 gradually ramps down), a rising time 3$T_r$2 (during which the voltage 3Vo2 gradually ramps up), or a falling time 3$T_f$2 (during which the voltage 3Vo2 gradually ramps down) may be equal to or more than a threshold. The flap 111Fa gradually swings upward during the rising time 3$T_r$1, while the flap 111Fb gradually swings downward during the falling time 3$T_f$2. The flap 111Fa gradually swings downward during the falling time 3$T_f$1, while the flap 111Fb gradually swings upward during the rising time 3$T_r$2. The rising time (e.g., 3$T_r$1 or 3$T_r$2), the falling time (e.g., 3$T_f$1 or 3$T_f$2), or the time for forming/closing the vent 113*vnt* may increase to smooth the pressure change between a chamber of the wearable sound device 10 and the external ambient environment, thereby reducing click noise.

In other words, if the rising time 3$T_r$1, 3$T_r$2, the falling time 3$T_f$1, and 3$T_f$2 are shorter than the threshold (duration) (i.e., 50 ms), click noise is audible/obvious/perceivable to an (ordinary) human hearing/ear, where click noise may be regarded as a kind of noticeable sound. In an embodiment, the threshold may be 50 milliseconds (ms). In an embodiment, the threshold may be a time length of a peak of click noise audible/obvious to an (ordinary) human ear. In an embodiment, the rising time 3$T_r$1, 3$T_r$2, the falling time 3$T_f$1, or 3$T_f$2 may be a function of the size of the flap 111Fa or 111Fb. In an embodiment, the rising time 3$T_r$1, 3$T_r$2, the falling time 3$T_f$1, or 3$T_f$2 may be 200 milliseconds or more. In an embodiment, the rising time (e.g., 3$T_r$1 or 3$T_r$2) may be different from the falling time (e.g., 3$T_f$1 or 3$T_f$2). In an embodiment, the rising time 3$T_r$1 or the falling time 3$T_f$1 for the flap 111Fa may be different from the rising time 3$T_r$2 or the falling time 3$T_f$2 for the flap 111Fb.

Figure 4:
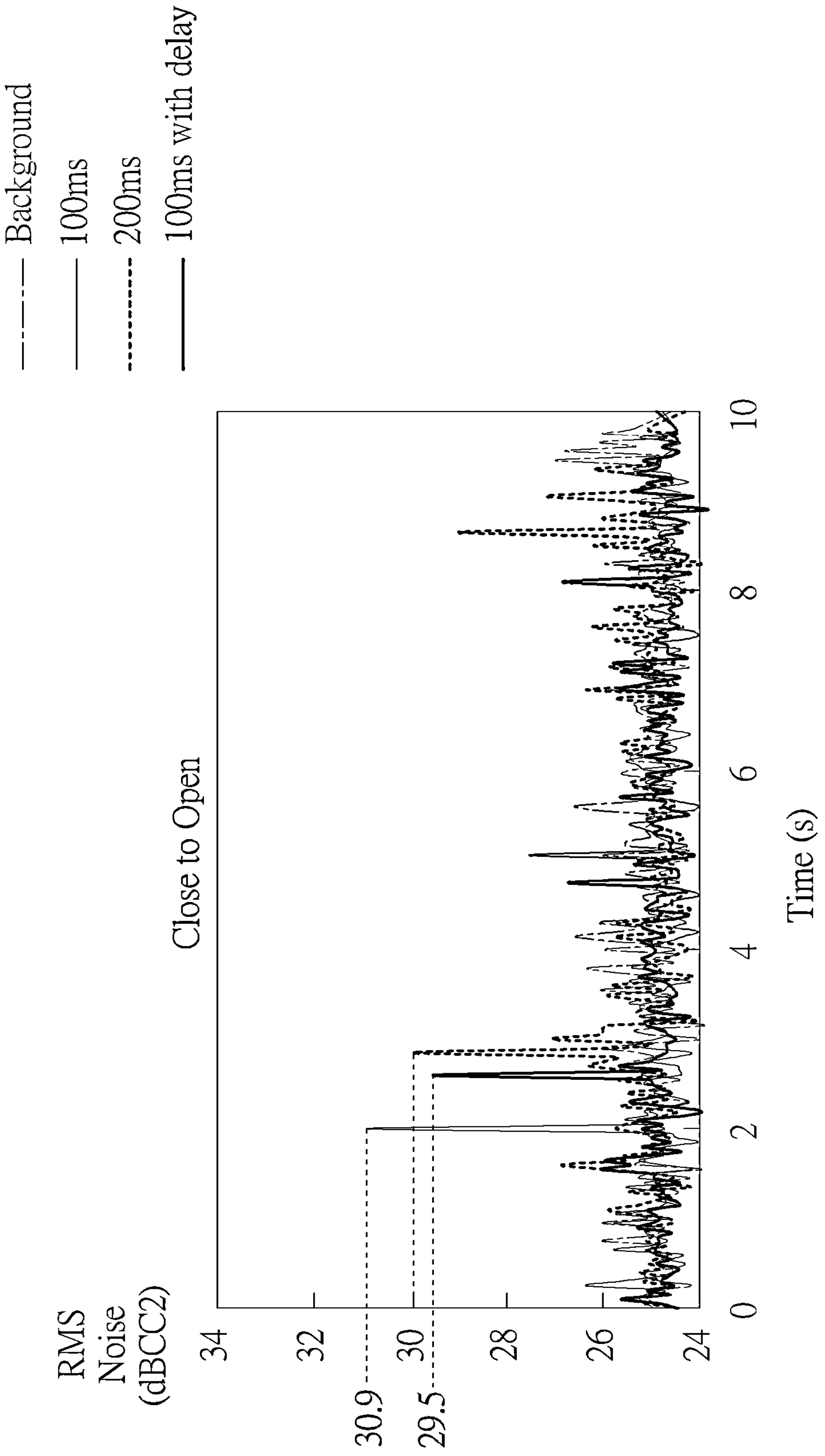
FIG. 4 is a schematic diagram of root mean square noise versus time according to embodiments of the present application.

FIG. 4 is a schematic diagram of (measured) root mean square (RMS) noise versus time according to embodiments of the present application. It shows that RMS noise is reduced from 30.9 dBCC2 to 30 dBCC2 as the rising time (e.g., 3$T_r$1, 3$T_r$2) and the falling time (e.g., 3$T_f$1, 3$T_f$2) are increased from 100 milliseconds (thin solid line) to 200 milliseconds (thin dashed line). Here, dBCC2 represents the weighting of CCIR-2K (with unity gain at 2 kilohertz) to express the relative loudness of sounds as perceived by a human ear. Generally, RMS noise exceeding 30 dBCC2 is audible (to individuals with special talents in hearing (referred to as golden ears)) and may be regarded as click noise, while RMS noise below 29 dBCC2 is inaudible (to golden ears). RMS noise in a range of 29 to 30 dBCC2 is defined as barely audible (to golden ears). According to FIG. 4, the longer the rising/falling time, the better the listening experience.

Figure 5:
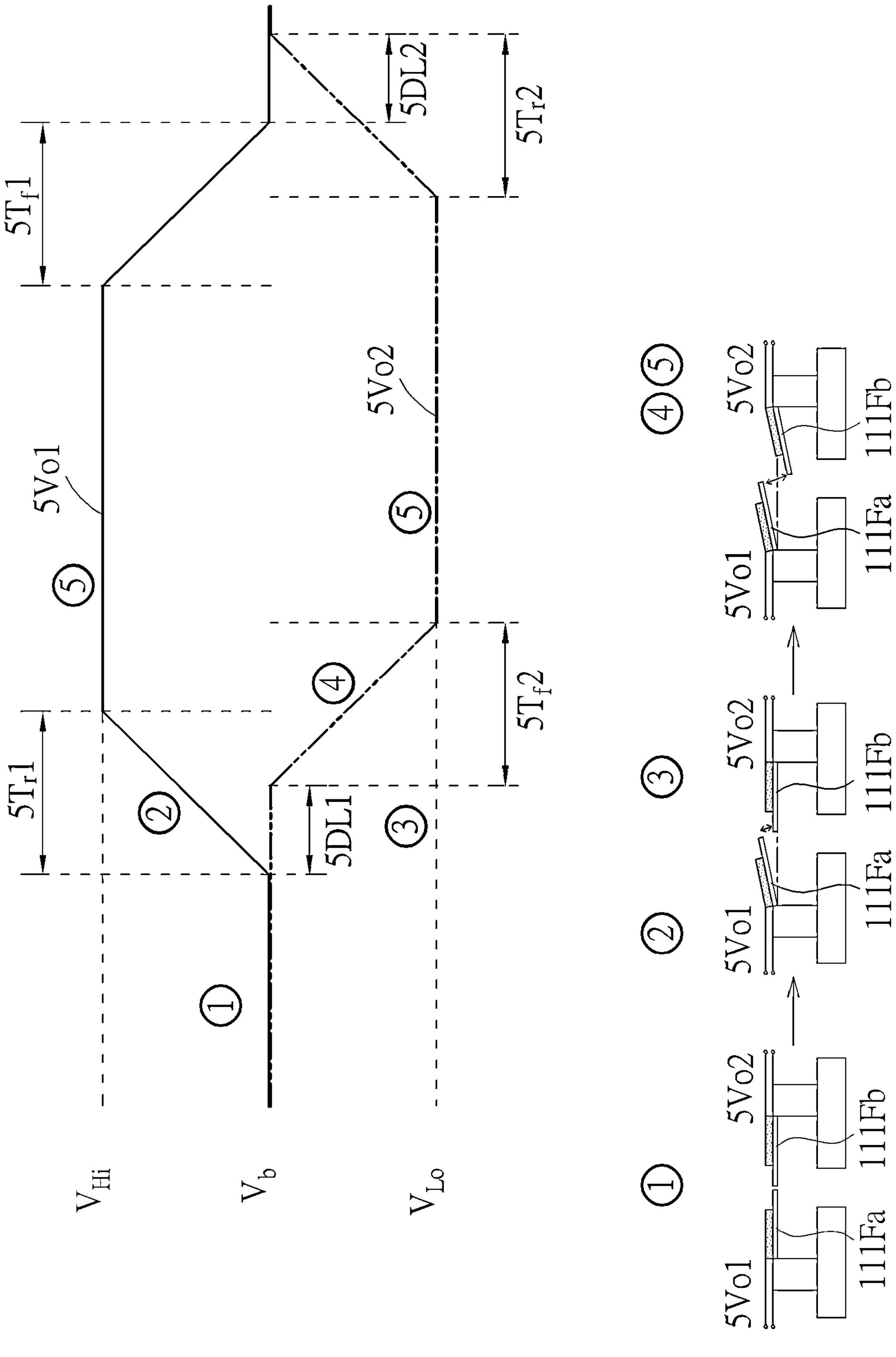
FIG. 5 to FIG. 7 are timing diagrams of voltages according to embodiments of the present application.

Click noise may be reduced by adding/inserting a delay between the rising time and the falling time. For example, FIG. 5 is a timing diagram of voltages 5Vo1, 5Vo2 according to an embodiment of the present application. The voltages 1Vo1, 1Vo2 may be implemented using the voltages 5Vo1, 5Vo2.

Different from FIG. 3, one flap (e.g., 111Fb) may swing after another flap (e.g., 111Fa) swings, to extend the time it takes for forming/closing the vent 113*vnt*. As shown by the circled number ① in FIG. 5, the flaps 111Fa and 111Fb are at a steady state, and the difference between the free ends of the flaps 111Fa and 111Fb in the direction Z is less than the thickness of the film structure 111 to close the vent 113*vnt*. In an embodiment, the two free ends may make physical contact with each other. Then, the rising time 5$T_r$1 starts. The voltage 5Vo1 for the flap 111Fa rises during the rising time 5$T_r$1 as shown by the circled number ②, and the vent 113*vnt* is gradually formed. The flap 111Fb keeps stationary (during part of the rising time 5$T_r$1 as shown by the circled number ③ until a delay 5DL1 has passed. The center of the vent 113*vnt* may move and deviate from the center line of the venting device 10*vnt*D during most of the rising time 5$T_r$1. After the falling time 5$T_f$2 starts, as shown by the circled number ④, the voltage 5Vo2 for the flap 111Fb drops during the falling time 5$T_f$2, such that the vent 113*vnt* is maximally opened to allow pressure neutralization. Subsequently, the flaps 111Fa and 111Fb are at a steady state, and vent 113*vnt* is opened for a (short) while as shown by the circled number ⑤. Similarly, the rising time 5$T_r$2 overlaps (or is partially incoincident) with the falling time 5$T_f$1 and is subject to a delay 5DL2. Staggering the rising time (e.g., 5$T_r$1 or 5$T_r$2) and the falling time (e.g., 5$T_f$1 or 5$T_f$2) may smooth the pressure change between a chamber of the wearable sound device 10 and the external ambient environment, thereby reducing click noise.

In an embodiment, the delay 5DL1 may be equal to or different from the delay 5DL2. In an embodiment, the delay 5DL1 (or 5DL2) between the start timing of the rising time $5T_r1$ (or $5T_r2$) and the start timing of the falling time $5T_f2$ (or $5T_f1$) is equal to or less than the rising time $5T_r1$ (or $5T_r2$) or the falling time $5T_f2$ (or $5T_f1$). In an embodiment, the delay 5DL1 (or 5DL2) may be 100 milliseconds.

FIG. 4 shows that RMS noise is further reduced from 30 dBCC2 to 29.5 dBCC2 as the rising time (e.g., $3T_r1$, $3T_r2$) and the falling time (e.g., $3T_f1$, $3T_f2$) are 200 milliseconds (thick solid line) together with a delay of 100 milliseconds. According to FIG. 4, the delay (e.g., 5DL1, 5DL2) between the rising time (e.g., $3T_r1$, $3T_r2$) and the falling time (e.g., $3T_f1$, $3T_f2$) improves listening experience further.

Figure 6:
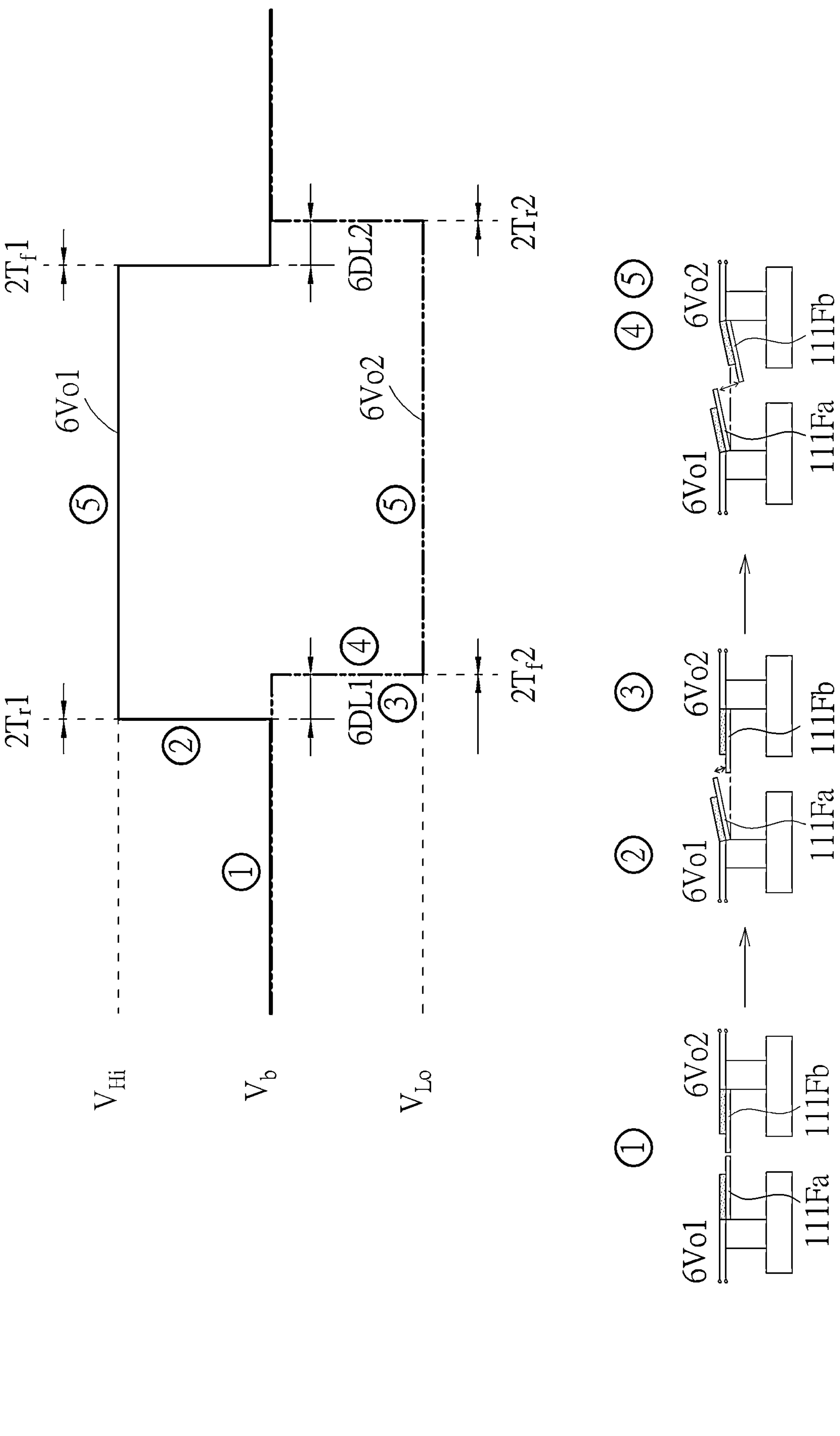

To reduce click noise, FIG. 6 also illustrates a timing diagram of voltages 6Vo1, 6Vo2 according to an embodiment of the present application. The voltages 1Vo1, 1Vo2 may be implemented using the voltages 6Vo1, 6Vo2. Different from FIG. 2, the start timing of a rising time $6T_r1$ (or $6T_r2$) is incoincident with the start timing of a falling time $6T_f2$ (or $6T_f2$) to reduce click noise. The center of the vent 113*vnt* may move and deviate from the center line of the venting device 10*vnt*D during a delay 6DL1 or 6DL2. The scheme shown in FIG. 6 may also be considered as gradually opening/forming the vent 113*vnt*.

Figure 7:
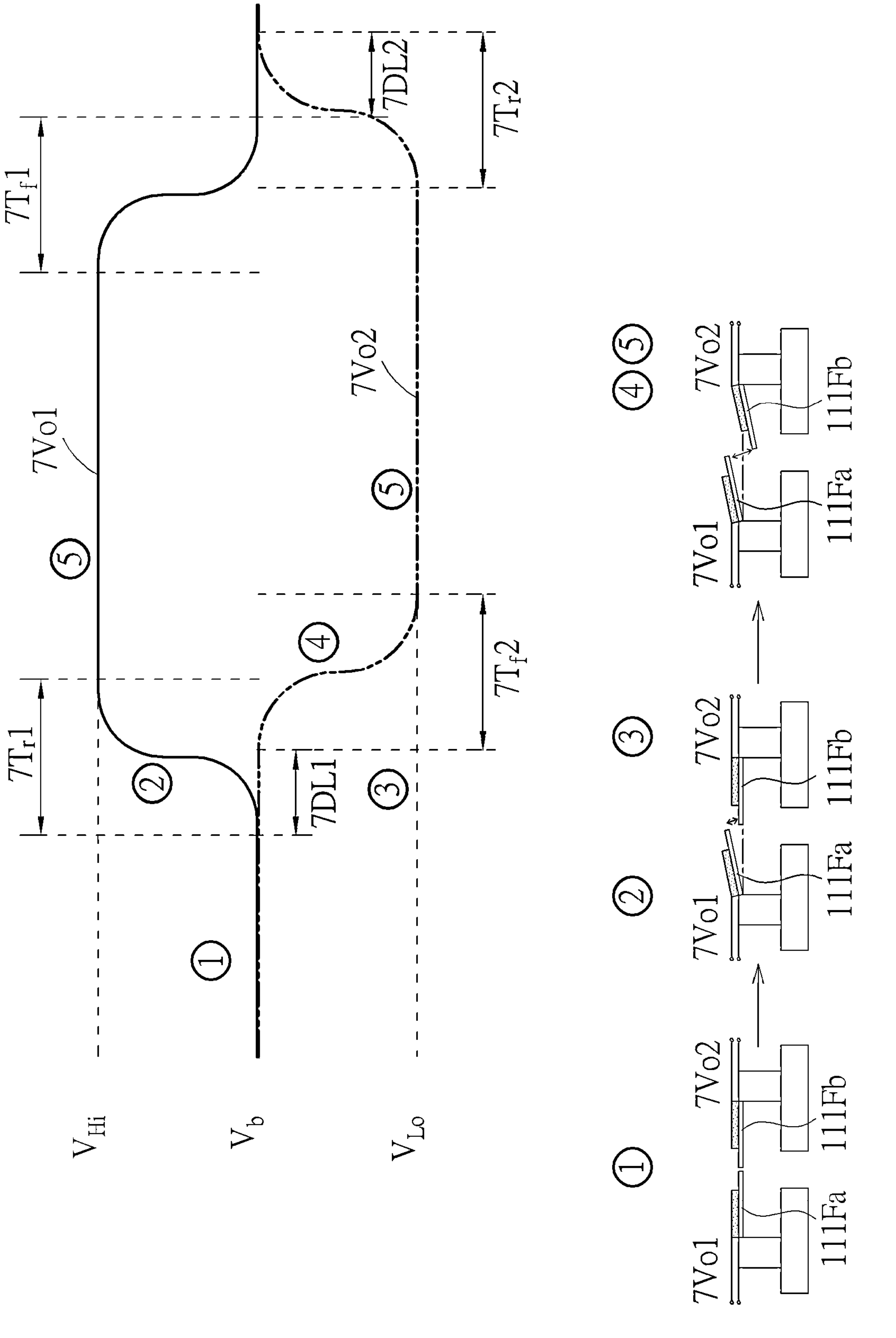

Voltages may be increased/decreased in various ways (e.g., linearly or nonlinearly). For example, FIG. 7 is a timing diagram of voltages 7Vo1, 7Vo2 according to an embodiment of the present application. The voltages 1Vo1, 1Vo2 may be implemented using the voltages 7Vo1, 7Vo2.

Figure 8:
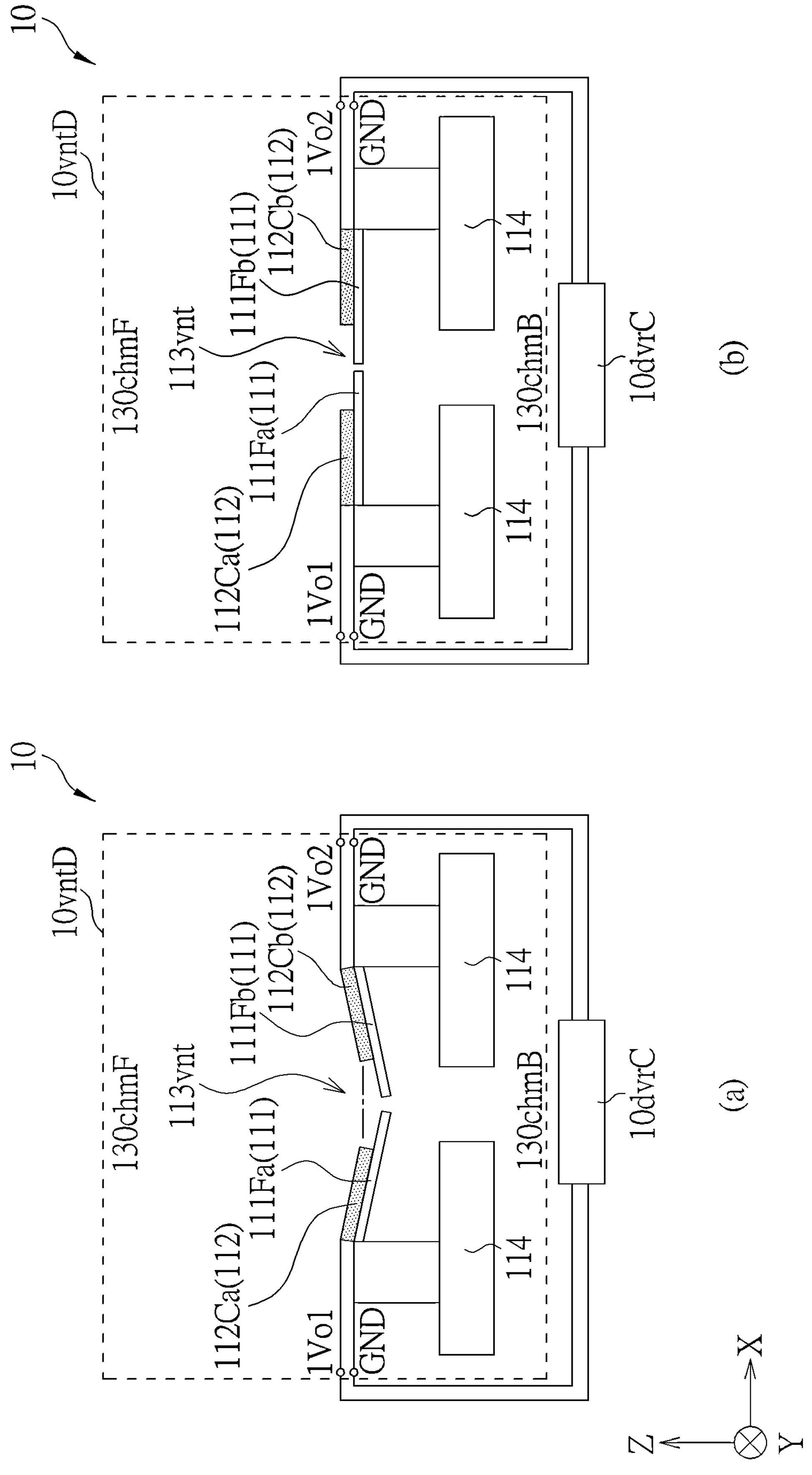
FIG. 8 is a schematic diagram of the wearable sound device shown in FIG. 1 according to embodiments of the present application.

Please refer to FIG. 1 and FIG. 8, which is a schematic diagram of the wearable sound device 10 according to embodiments of the present application. As set forth above, when the wearable sound device 10 operates in the first/open mode shown in FIG. 1 (*a*), the flaps 111Fa and 111Fb slope oppositely by applying the voltage 1Vo1 higher than the common voltage $V_b$ to the actuating portion 112Ca and applying the voltage 1Vo2 lower than the common voltage $V_b$ to the actuating portion 112Cb, and the vent 113*vnt* has a first opening width. When the wearable sound device 10 operates in the second/close mode shown in FIG. 1 (*b*) and FIG. 8 (*b*), the flaps 111Fa and 111Fb remain horizontal/parallel by applying the common voltage $V_b$ to the actuating portions 112Ca and 112Cb, and the vent 113*vnt* has a second opening width.

Different from the first/open mode or the second/close mode, when the wearable sound device 10 operates in a third/comfort mode shown in FIG. 8 (*a*), the flaps 111Fa and 111Fb hang neutrally/loosely and tilt below the horizontal by grounding or floating the actuating portions 112Ca and 112Cb, and the vent 113*vnt* has a third opening width. The first opening width is the largest of the three, and the second opening width is narrower than the third opening width. The small vent 113*vnt* created in the third/comfort mode may relieve pressure building up in the ear canal to improve comfort and save energy.

Figure 9:
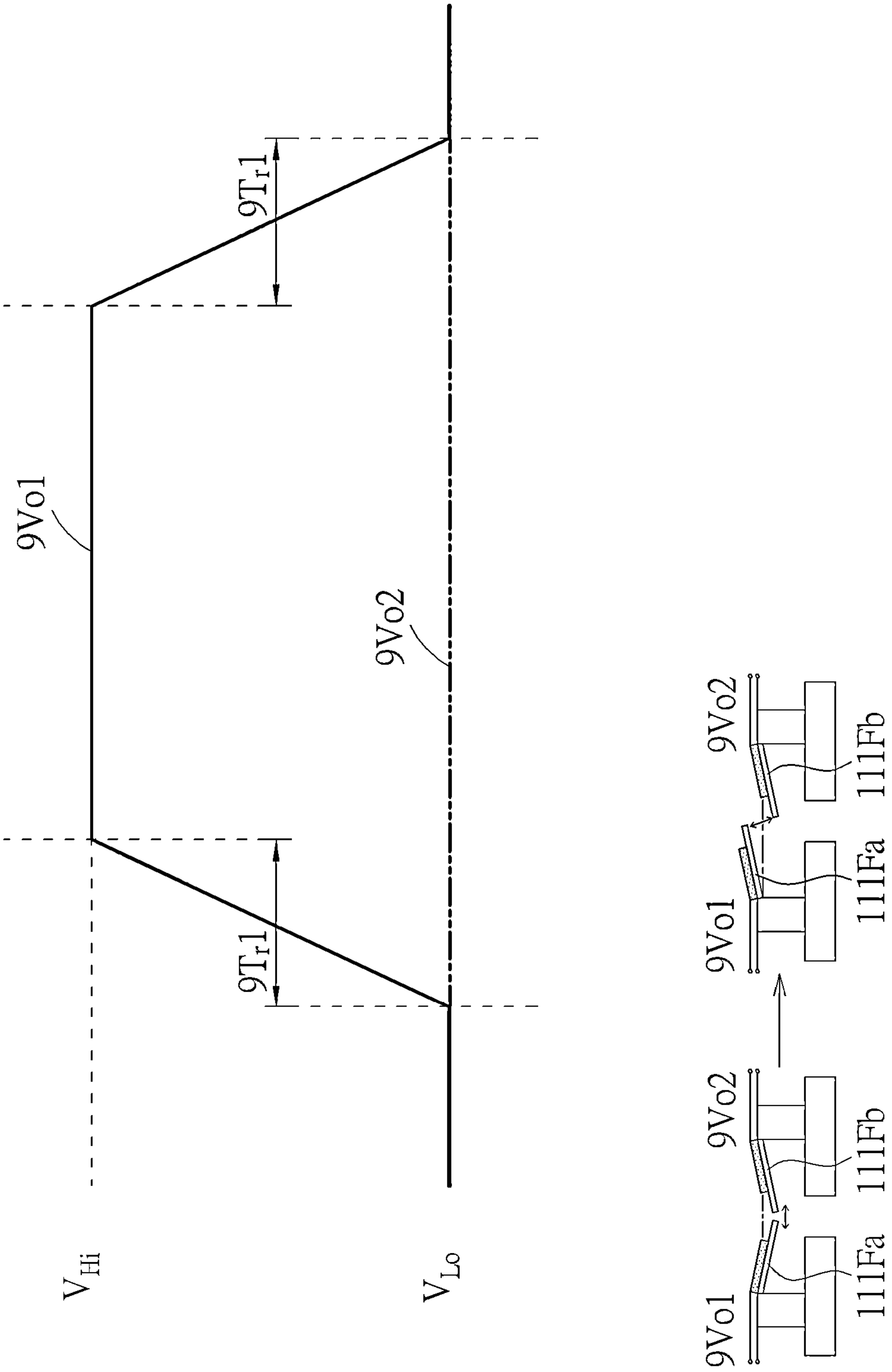
FIG. 9 and FIG. 10 are timing diagrams of voltages according to embodiments of the present application.

In addition to switching between the first/open mode and the second/close mode as shown in FIG. 3, 5, 6, or 7, the wearable sound device 10 switching to/from the third/comfort mode may not make much click noise but operates quietly. For example, FIG. 9 is a timing diagram of voltages 9Vo1, 9Vo2 according to an embodiment of the present application. The voltages 1Vo1, 1Vo2 may be implemented using the voltages 9Vo1, 9Vo2.

To open the vent 113*vnt* (i.e., from the third/comfort mode to the first/open mode), as shown in FIG. 9, the voltage 9Vo1 applied to the actuating portion 112Ca gradually increases from the low level voltage $V_{Lo}$ to the high level voltage VIE during a rising time $9T_r1$ for the flap 111Fa to swing upward, while the voltage 9Vo2 and the flap 111Fb remain unchanged. To loosen the flaps 111Fa and 111Fb (i.e., from the first/open mode to the third/comfort mode), the voltage 9Vo1 may gradually decreases from the high level voltage VIE to the low level voltage $V_{Lo}$ during a falling time $9T_f1$ for the flap 111Fa to swing downward, while the voltage 9Vo2 and the flap 111Fb still remain unchanged. The rising time $9T_r1$, the falling time $9T_f1$, or the time for forming/closing the vent 113*vnt* may be long to reduce click noise.

Figure 10:
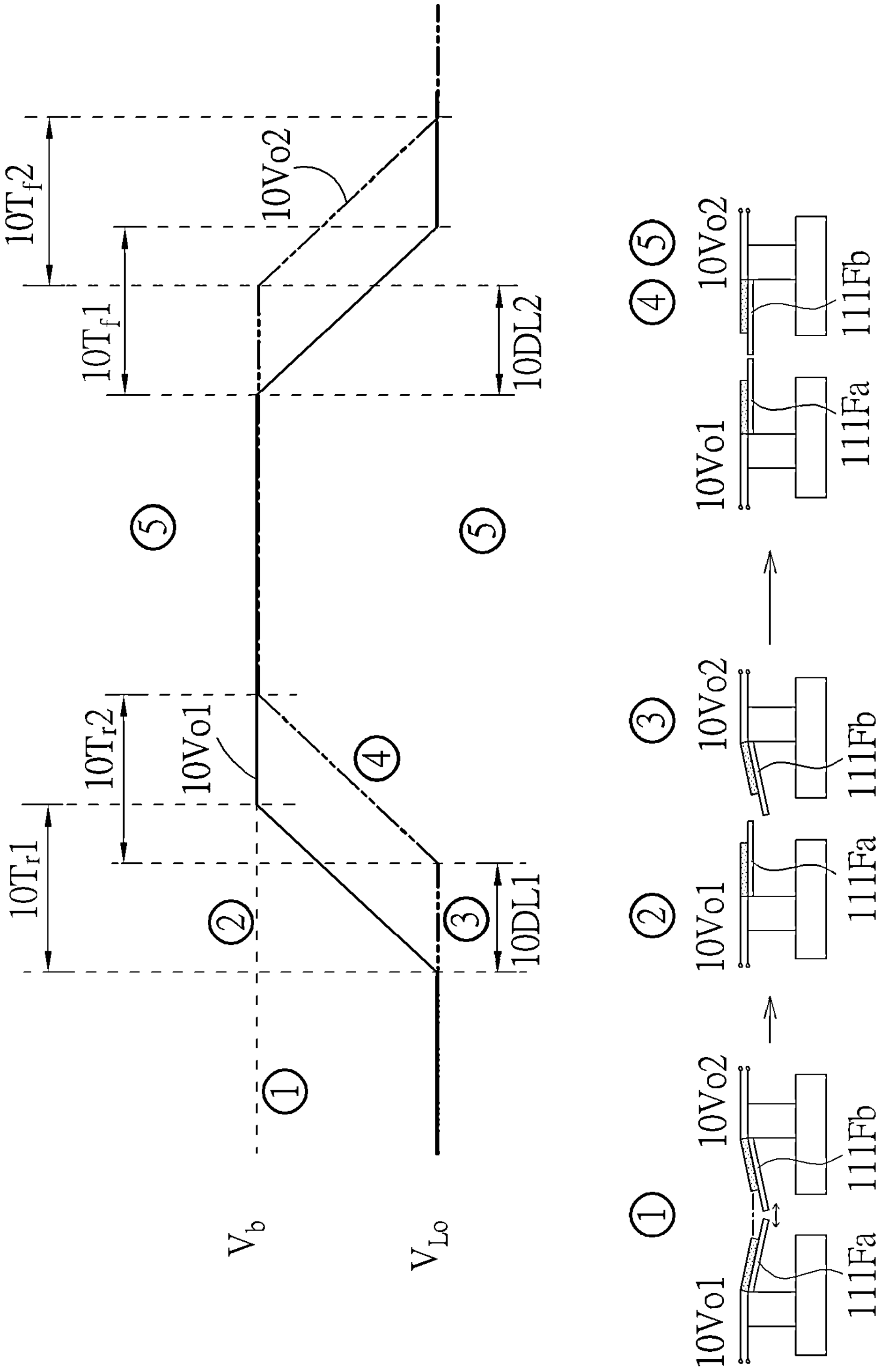

FIG. 10 is a timing diagram of voltages 10Vo1, 10Vo2 according to an embodiment of the present application. The voltages 1Vo1, 1Vo2 may be implemented using the voltages 10Vo1, 10Vo2.

To close the vent 113*vnt* (i.e., from the third/comfort mode to the second/close mode), as shown in FIG. 10, the voltage 10Vo1 applied to the actuating portion 112Ca may gradually increases from the low level voltage $V_{Lo}$ to the common voltage $V_b$ during a rising time $10T_r1$ before the voltage 10Vo2 applied to the actuating portion 112Cb gradually increases from the low level voltage Vim to the common voltage $V_b$ during a rising time $10T_r2$. To loosen the flaps 111Fa and 111Fb (i.e., from the second/close mode to the third/comfort mode), the voltage 10Vo1 may gradually decreases from the common voltage $V_b$ to the low level voltage Vim during a falling time $10T_f1$ before the voltage 10Vo2 gradually decreases from the common voltage $V_b$ to the low level voltage $V_{Lo}$ during a falling time $10T_f2$. Besides, the flap 111Fb swings after the flap 111Fa has already started swinging, resulting in a delay 10DL1 between the rising time $10T_r1$ and $10T_r2$ or a delay 10DL2 between the falling time $10T_f1$ and $10T_f2$. These may reduce click noise.

In an embodiment, the delay 10DL1 or 10DL2 may be implemented using the delay 5DL1 or 5DL2. In an embodiment, the delay 10DL1 may be equal to or different from the delay 10DL2. In an embodiment, the delay 10DL1 (or 10DL2) is equal to or less than the rising time $10T_r1$, $10T_r2$ (or the falling time $10T_f2$, $10T_f1$).

Any mechanism that can create or obstruct a vent can be utilized as the wearable sound device 10 of the present invention. Details or modifications of a wearable sound device, a venting device, or a driving circuit are disclosed in U.S. application Ser. Nos. 17/842,810, 17/344,980, 17/344,983, 17/720,333, 18/172,346, 18/303,599, and 18/366,637, the disclosure of which is hereby incorporated by reference herein in its entirety and made a part of this specification.

The use of ordinal terms such as “first” and “second” does not by itself imply any priority, precedence, or order of one element over another, the chronological sequence in which acts of a method are performed, or the necessity for all the elements to be exist at the same time, but these terms are simply used as labels to distinguish one element having a certain name from another element having the same name. The technical features described in the following embodiments may be mixed or combined in various ways as long as there are no conflicts between them.

To sum up, the change in size of a vent over time is reduced to diminish any audible click noise. This can be achieved by either prolonging a rising time or a falling time of a flap to slow down its motion or having two adjacent flaps move asynchronously/non-concurrently. The present invention may therefore improve user experience.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A venting device, comprising:
a first flap, configured to be actuated to swing upward during a rising time;
a second flap, disposed opposite to the first flap and configured to be actuated to swing downward during a falling time;
a first actuating portion, disposed on the first flap; and
a second actuating portion, disposed on the second flap;
wherein the venting device, configured to form a vent, is disposed within a wearable sound device or to be disposed within the wearable sound device;
wherein the vent is formed via applying a first voltage to the first actuating portion and applying a second voltage on the second actuating portion, such that the venting device gradually forms the vent.

2. The venting device of claim 1, wherein the rising time or the falling time is equal to or more than 50 milliseconds.

3. The venting device of claim 1, wherein the rising time or the falling time is longer than a threshold, such that no noticeable sound is perceived by human hearing when the venting device forms the vent.

4. The venting device of claim 1,
wherein the first voltage applied to the first actuating portion gradually increases during the rising time, and the second voltage applied to the second actuating portion gradually decreases during the falling time, such that the first flap gradually swings upward, the second flap gradually swings downward, and the vent of the venting device is gradually opened.

5. The venting device of claim 1, wherein a delay is inserted between a start timing of the rising time and a start timing of the falling time.

6. The venting device of claim 1, wherein the rising time overlaps with the falling time.

7. The venting device of claim 1, wherein a delay between a start timing of the rising time and a start timing of the falling time is equal to or less than the rising time or the falling time.

8. The venting device of claim 1,
wherein the first voltage applied to the first actuating portion is unchanged during part of the falling time, and the second voltage applied to the second actuating portion is unchanged during part of the rising time.

9. The venting device of claim 1, wherein
one of the first flap and the second flap swings after the other of the first flap and the second flap has already started swinging; or
a center of the vent of the venting device deviates from a center line of the venting device during most of the rising time or most of the falling time.

10. The venting device of claim 1,
wherein the venting device is driven by a driving circuit;
where the driving circuit is configured to output the first voltage to the first actuating portion and output the second voltage to the second actuating portion.

11. A venting method, comprising:
actuating a first flap to gradually swing upward during a rising time; and
actuating a second flap to gradually swing downward during a falling time;
wherein the venting method is applied for a venting device;
wherein the venting device is disposed within a wearable sound device or to be disposed within the wearable sound device;
wherein the venting device is configured to form a vent;
wherein the venting device comprises the first flap and the second flap.

12. The venting method of claim 11, wherein the rising time or the falling time is equal to or more than 50 milliseconds.

13. The venting method of claim 11, wherein the rising time or the falling time is longer than a threshold duration, such that no noticeable sound is perceived by human hearing when the venting device forms the vent.

14. The venting method of claim 11, comprising:
applying a first voltage to a first actuating portion on the first flap; and
applying a second voltage to a second actuating portion on the second flap;
wherein the first voltage gradually increases during the rising time and the second voltage gradually decreases during the falling time, such that the venting device gradually opens the vent.

15. The venting method of claim 11, comprising:
inserting a delay between a start timing of the rising time and a start timing of the falling time.

16. The venting method of claim 11, wherein the rising time overlaps with the falling time.

17. A venting device, comprising:
a first flap, configured to be actuated to gradually swing upward during a rising time; and
a second flap, disposed opposite to the first flap and configured to be actuated to swing downward during a falling time;
wherein a slit is formed between the first flap and the second flap;
wherein the venting device is configured to form a vent, and the vent is formed because of the slit;
wherein the venting device is disposed within a wearable sound device or to be disposed within the wearable sound device.

18. The venting device of claim 17, wherein the second flap is configured to remain stationary during the rising time.

19. The venting device of claim 17, wherein the rising time or the falling time is equal to or more than 50 milliseconds.

20. The venting device of claim 17, wherein the second flap is configured to be actuated to gradually swing upward during a second rising time, and a delay between a start timing of the rising time and a start timing of the second rising time of the second flap is equal to or less than the rising time or the second rising time.

21. The venting device of claim 17, wherein the first flap is configured to remain stationary during the falling time.

* * * * *